March 12, 1929.  J. C. JANES  1,705,155
PROCESS OF MAKING STEEL ETCHING PLATES
Filed June 7, 1927
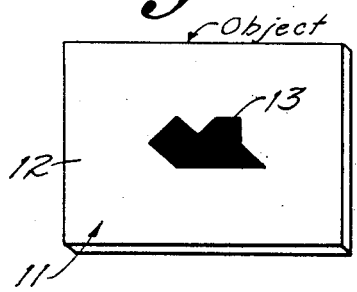
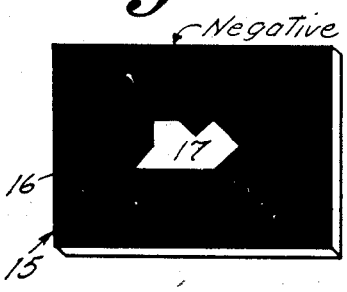
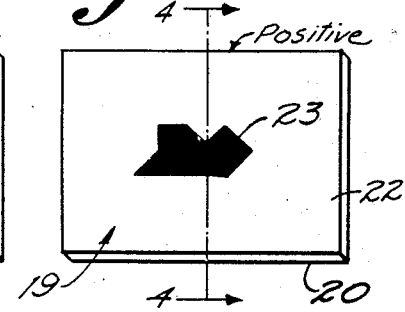
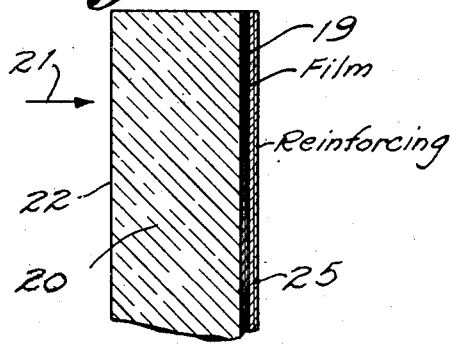
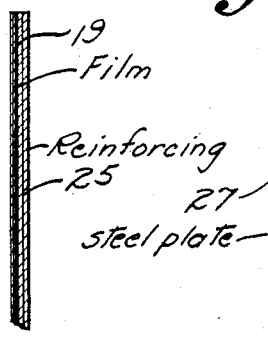
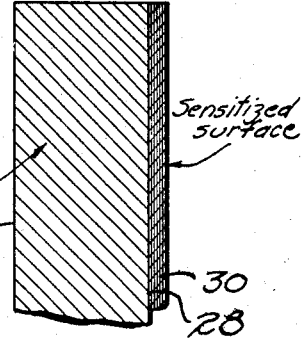
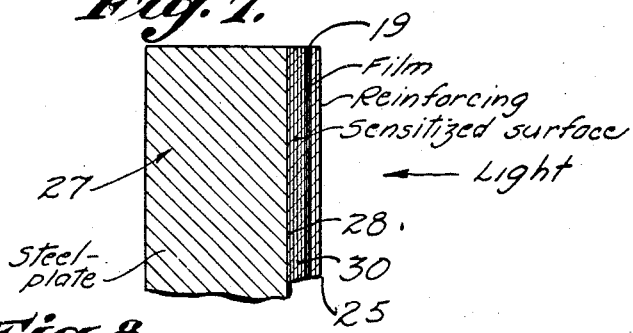
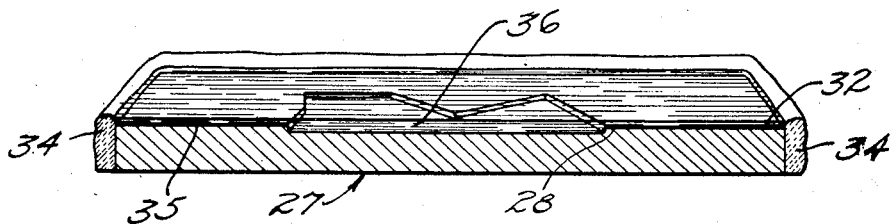
INVENTOR:
JOHN C. JANES.
By
ATTORNEY.

Patented Mar. 12, 1929.

1,705,155

UNITED STATES PATENT OFFICE.

JOHN C. JANES, OF ALHAMBRA, CALIFORNIA, ASSIGNOR TO THE T. V. ALLEN COMPANY, OF LOS ANGELES, CALIFORNIA, A CORPORATION OF CALIFORNIA.

PROCESS OF MAKING STEEL ETCHING PLATES.

Application filed June 7, 1927. Serial No. 197,186.

This invention relates to methods of etching steel plates and has for an object to provide for making an etched steel plate which will accurately reproduce the object from which it is made. The invention is useful for making any type of steel plate and has a particular utility in the art of making three-color plates.

The various other objects of the invention will be pointed out in the following description which will refer to the accompanying drawing. In this drawing, Fig. 1 is the object.

Fig. 2 is a negative film made from the object.

Fig. 3 is a backward positive film made from the negative film.

Fig. 4 is a cross section through the positive film.

Fig. 5 is a view of the positive film after it has been stripped from a transparent plate.

Fig. 6 is a section showing a steel plate to be etched.

Fig. 7 is a section showing the positive film applied to the steel plate.

Fig. 8 is a perspective view showing the steel plate being acid treated.

Referring to the drawing in detail, the numeral 11 represents an object which has been arbitrarily selected for the purpose of illustrating the invention. The object consists of a white area 12 having a central black configuration 13. The first step in the process is to make the negative film 15. The negative film 15 after it has been developed has a black surrounding area 16 and a white configuration 17. The configuration 17 is in a position reverse to that of the black configuration 13 of the object 11. The next step in the process is to make the backward positive film 19. The backward positive film 19 is retained on a transparent plate such as the glass plate 20. In order to obtain a backward image, the positive film 19 is exposed through the transparent plate 20, as indicated by the arrow 21 of Fig. 4. The positive film, as shown in Fig. 3, has a white surrounding area 22 and a black configuration 23 which is of the same relative position as the white configuration 17 of the negative film 15 and in a position reverse to that of the black configuration 13 of the object 11. It is necessary in the process to have a backward positive film such as indicated at 19, and different methods of obtaining this may be used without departing from the invention.

The next step in the process is to remove or strip the film 19 from the transparent plate 20. Before this is done, however, a reinforcing coating 25 is applied to the outer face of the film 19 to prevent it from tearing or stretching when it is removed from the transparent plate 20. For this purpose I prefer to apply two or three coatings of collodion. The positive film is then stripped from the transparent plate 20, this being conveniently accomplished by subjecting it to an acid bath of about fifteen minutes which loosens the film from the plate. In Fig. 5 I show the film 19 and the reinforcing coating 25 after they have been stripped from the transparent plate 20. The positive film is then dried, this being conveniently done by placing it between layers of blotting paper.

In Fig. 6 the numeral 27 represents the steel plate which is to be etched. The surface 28 of the steel plate 27 must first be very thoroughly cleaned to remove all grease or other foreign matter. For this purpose I use benzine and whiting which is applied by rubbing it on with a rag, the whiting and benzine being thereafter washed off. The rubbing action is kept up until all grease spots are removed.

A protecting coating is then applied to the surface 28. This protecting coating is any suitable solution which, when applied, will prevent chemical action on the plate when the sensitizing coating is applied. The surface 28 is thereafter sensitized by applying a sensitizing coating thereto. Any suitable sensitizing solution may be applied. It is, of course, understood that the sensitizing coating is applied in a dark room. I prefer to apply the sensitizing coating in the form of a solution and in the following manner The plate 27 is tilted and the sensitizing solution is poured on at one corner so that it will flow toward the other three corners of the plate As the sensitizing solution moves across the plate any excess of protecting coating which has been applied will be forced from the face 28. It is only necessary to have an extremely thin coating of the protecting solution. After this application of sensitizing solution it is dried. The sensitizing coating must be dried very evenly and I prefer to place the plate on a whirler and rotate it during drying. In Figs. 6 and 7 the numeral 30 represents the sensitizing coating which has just been applied.

The outer face of the sensitizing coating or the sensitized surface of the plate 27 may be slightly sticky. It is, therefore, desirable to apply a liquid coating to this face so that the positive film 19 will not stick to it. For this purpose I prefer to use oil which will not dissolve the sensitizing coating 30. Any other suitable liquid may be used. The positive film 19 is then placed against the sensitizing coating 30 as shown in Fig. 7, the reinforcing coating 25 being on the outside. The liquid coating is then squeezed from between the sensitizing coating 30 and the film 19 by use of squeegees. The viscosity of the liquid coating is sufficient to retain the film 19 in absolute contact with the surface of the sensitizing coating 30.

The steel plate 27 is then exposed for a suitable length of time, thereafter being returned to the dark room where the positive film is removed. At this time the liquid coating of oil is still on the surface of the sensitizing coating 30 and must be removed. This is done by applying a suitable solution.

The sensitizing coating is then developed by use of water. The parts which are exposed are hard, whereas the parts which are not exposed are soft and will wash away so as to expose the adjacent portion of the steel plate. As shown in Fig. 8 the exposed portion 32 of the sensitizing coating 30 remains in place, whereas the central part which is covered by the black configuration 23 of the positive film 19 will wash away because it has not been exposed. The coating on the plate 27 is then dried and baked so that it will resist the action of the acid. This is conveniently done by holding it over a burner. At this time any stopping out which is desired is done.

The next step in the process is to etch the steel plate 27 by applying acid to the part which is not covered by the coating 30. The wax wall 34 is built around the steel plate 27 so that a body of acid 35 may be retained on it. The acid 35 is then poured into the basin formed by the wax wall 34 and will eat away the part of the steel plate which is not covered by the coating 30, this part being of the same shape and position as the configuration 23 of the positive film 19. The acid eats an impression 36 in the steel plate 27. In order to prevent overheating, the plate must be cooled. This is done by quickly pouring off the acid and pouring on cold water. The water is then poured from the plate and more acid applied. This is done four or five times until the proper depth of depression 36 is obtained. After the etching has been accomplished the steel plate is washed and the remaining coating 30 is removed by rubbing charcoal on the face of the steel plate.

I claim as my invention:

1. A method of making an etched plate comprising: forming a backward positive image on a film; sensitizing the surface of a plate to be etched; applying said film to said sensitized surface; exposing said sensitized surface; developing said sensitized surface, the unexposed parts being removed so that said plate is exposed; and applying acid to the exposed parts of said plate.

2. A method of making an etched plate comprising: forming a backward positive image on a film which is retained on a transparent plate; reinforcing said film and stripping it from said transparent plate; sensitizing the surface of a plate to be etched; applying said film to said sensitized surface; exposing said sensitized surface; developing said sensitized surface, the unexposed parts being removed so that said plate is exposed; and applying acid to the exposed parts of said plate.

3. A method of making an etched plate comprising: forming a backward positive image on a film; sensitizing the surface of a plate to be etched; applying a liquid coating to said sensitized surface to prevent the film from tearing or stretching when it is removed from the plate; applying said film to said sensitized surface; exposing said sensitized surface; developing said sensitized surface, the unexposed parts being removed so that said plate is exposed; and applying acid to the exposed parts of said plate.

4. A method of making an etched plate comprising: forming a backward positive image on a film which is retained on a transparent plate; reinforcing said film and stripping it from said transparent plate; sensitizing the surface of a plate to be etched; applying a liquid coating to said sensitized surface to prevent the film from tearing or stretching when it is removed from the plate; applying said film to said sensitized surface; exposing said sensitized surface; developing said sensitized surface, the unexposed parts being removed so that said plate is exposed; and applying acid to the exposed parts of said plate.

5. A method of making an etched plate comprising: forming a backward positive image on a film; sensitizing the surface of a plate to be etched; applying an oil coating to said sensitized surface; applying said film to said sensitized surface; exposing said sensitized surface; developing said sensitized surface, the unexposed parts being removed so that said plate is exposed; and applying acid to the exposed parts of said plate.

6. A method of making an etched plate comprising: forming a backward positive image on a film; sensitizing the surface of a plate to be etched; applying a liquid to said sensitized surface, which when dry will prevent the film from tearing or stretching when it is removed from the plate; applying said film to said sensitized surface; exposing said sensitized surface; developing said sensitized surface, the unexposed parts being removed so that said plate is exposed; and applying acid to the exposed parts of said plate.

7. A method of making an etched plate comprising: forming a backward positive image on a film; sensitizing the surface of a plate to be etched; applying a coating of collodian to said sensitized surface to prevent the film from tearing or stretching when it is removed from the plate; applying said film to said sensitized surface; exposing said sensitized surface; developing said sensitized surface, the unexposed parts being removed so that said plate is exposed; and applying acid to the exposed parts of said plate.

8. A method of making an etched plate comprising: forming a backward positive image on a film which is retained on a transparent plate; reinforcing said film and stripping it from said transparent plate; sensitizing the surface of a plate to be etched; applying collodion to said sensitized surface; applying said film to said sensitized surface; exposing said sensitized surface; developing said sensitized surface, the unexposed parts being removed so that said plate is exposed; and applying acid to the exposed parts of the plate.

In testimony whereof, I have hereunto set my hand at Los Angeles, California, tnis 1st day of June, 1927.

JOHN C. JANES.